US012770619B2

(12) United States Patent
Sakano

(10) Patent No.: US 12,770,619 B2
(45) Date of Patent: Oct. 20, 2026

(54) VOICE OPERATION CONTROL DEVICE AND VOICE OPERATION METHOD

(71) Applicant: JVCKENWOOD Corporation, Yokohama (JP)

(72) Inventor: Masakiyo Sakano, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 172 days.

(21) Appl. No.: 18/769,456

(22) Filed: Jul. 11, 2024

(65) Prior Publication Data

US 2024/0363114 A1 Oct. 31, 2024

Related U.S. Application Data

(63) Continuation of application No. PCT/JP2023/000167, filed on Jan. 6, 2023.

(30) Foreign Application Priority Data

Jan. 27, 2022 (JP) ................................ 2022-010662
Mar. 25, 2022 (JP) ................................ 2022-050753

(51) Int. Cl.
*G10L 15/22* (2006.01)
*G10L 15/02* (2006.01)

(52) U.S. Cl.
CPC .............. *G10L 15/22* (2013.01); *G10L 15/02* (2013.01)

(58) Field of Classification Search
CPC ....................................................... G10L 15/22
See application file for complete search history.

(56) References Cited

U.S. PATENT DOCUMENTS 6,697,782 B1 * 2/2004 Iso-Sipila ............... G10L 15/08 704/275
11,102,389 B2 * 8/2021 Wakamatsu ........... H04N 23/64
(Continued)

FOREIGN PATENT DOCUMENTS

JP 2005-090837 4/2005
JP 2010-181280 8/2010
(Continued)

OTHER PUBLICATIONS

International Search Report and Written Opinion for International Application Serial No. PCT/JP2023/000167mailed on Mar. 14, 2023 9 pages.

*Primary Examiner* — Douglas Godbold
(74) *Attorney, Agent, or Firm* — Amin, Turocy & Watson, LLP

(57) ABSTRACT

A voice operation control device includes: a voice command determination unit configured to recognize an utterance of a user and determine whether the recognized utterance is a voice command; and a voice command accepting unit configured to accept the accepted voice command. The voice command determination unit is configured to, when the accepted utterance indicates that an utterance coincident with a preset voice command at a level equal to or larger than a first threshold has been detected, determine that the recognized utterance is the voice command. The voice command determination unit is configured to, when the accepted utterance indicates that an utterance that is equal to or larger than a second threshold, which indicates a lower degree of coincidence than the first threshold, but less than the first threshold has been detected more than once within a predetermined time period, determine that the recognized utterance is the voice command.

3 Claims, 8 Drawing Sheets

(56) References Cited

U.S. PATENT DOCUMENTS

| | | | | | |
|---|---|---|---|---|---|
| 11,138,976 | B1 * | 10/2021 | Bailey | G06F 3/167 | |
| 11,322,138 | B2 * | 5/2022 | Li | G10L 15/08 | |
| 11,430,435 | B1 * | 8/2022 | Kahan | G10L 15/1822 | |
| 11,900,921 | B1 * | 2/2024 | Gupta | G10L 15/16 | |
| 2002/0188454 | A1 * | 12/2002 | Sauber | G06V 10/98 | 704/E15.04 |
| 2003/0236664 | A1 * | 12/2003 | Sharma | G10L 15/08 | 704/251 |
| 2006/0074651 | A1 * | 4/2006 | Arun | G10L 15/22 | 704/E15.04 |
| 2015/0199965 | A1 * | 7/2015 | Leak | G10L 15/22 | 704/249 |
| 2017/0374273 | A1 * | 12/2017 | Butts | H04N 23/60 | |
| 2021/0295833 | A1 * | 9/2021 | Rastrow | G10L 15/222 | |
| 2021/0357172 | A1 * | 11/2021 | Sinesio | G06F 16/48 | |
| 2022/0068261 | A1 * | 3/2022 | Sharifi | G10L 15/08 | |
| 2022/0366905 | A1 * | 11/2022 | Smarr | G10L 15/30 | |
| 2022/0383870 | A1 * | 12/2022 | Hsu | G10L 15/32 | |
| 2023/0019737 | A1 * | 1/2023 | Barros | G10L 15/22 | |
| 2023/0035752 | A1 * | 2/2023 | Gowda | B60W 50/10 | |
| 2024/0005926 | A1 * | 1/2024 | Wood | G06F 3/167 | |

FOREIGN PATENT DOCUMENTS

| | | |
|---|---|---|
| JP | 2013-257448 | 12/2013 |
| JP | 2016-009202 | 1/2016 |
| JP | 2020-128206 | 8/2020 |
| JP | 2020-154904 | 9/2020 |
| JP | 2020-205637 | 12/2020 |

* cited by examiner

VOICE OPERATION CONTROL DEVICE AND VOICE OPERATION METHOD

CROSS-REFERENCE TO RELATED APPLICATIONS

This application is a Continuation of PCT International Application No. PCT/JP2023/000167 filed on Jan. 6, 2023 which claims the benefit of priority from Japanese Patent Application No. 2022-010662 filed on Jan. 27, 2022 and Japanese Patent Application No. 2022-050753 filed on Mar. 25, 2022, the entire contents of all of which are incorporated herein by reference.

BACKGROUND

The present invention relates to a voice operation control device and a voice operation method.

Various applications and devices, such as smartphone applications and video cameras, respond to an operation based on a voice command. Such devices can be operated without performing physical operations and can also be remotely operated as long as the operation is performed at a short distance. Japanese Laid-open Patent Publication No. 2020-205637 discloses an image capturing device that can be operated by a voice command. Furthermore, among on-vehicle recording devices corresponding to what is called drive recorders, some devices perform event recording in response to a voice command in addition to performing impact detection obtained by an acceleration sensor. A record instruction provided by a voice command does not need an operation of a touch panel or the like while driving, so that it is possible to safely record event data and still images. Japanese Laid-open Patent Publication No. 2020-154904 discloses a process of storing still images in addition to the event recording.

For example, in a case where a user controls a recording of a video image or a still image performed on the basis of a voice command by using a video camera, such as a smartphone or an action camera, it is sometimes difficult for the user to perform a physical operation while, for example, riding a bicycle, running on a snowboard, or the like. In such a state, even in the case where the user is not able to accurately utter the voice command or even in the case where the user has accurately uttered words, there may sometimes be a case in which the voice command is not able to be appropriately recognized. In such a case, a timing of recording of the video image or the still image is accordingly delayed.

Furthermore, in the drive recorder, when a driver of a vehicle desires to capture attractive facilities, landscapes, or the like during driving or desires to perform an event recording, there may sometimes be a case in which the driver gives an instruction to record a video image or a still image by using a voice command. However, regarding the voice command for performing a recording of the video image or the still image, a different voice command is used for each type of device, redundancy is required to prevent malfunction, a frequency of use in the voice command is low, and the like, so that, in some cases, the driver is not able to instantly utter an accurate voice command. As a result of this, in the case where a recording of the video image or the still image is performed by using the voice command, the timing of the recording of the video image or the still image is accordingly delayed due to inability for the user to instantly utter the accurate voice command.

SUMMARY

A voice operation control device according to one aspect of the present disclosure includes: a voice command determination unit configured to recognize an utterance made by a user and determine whether the recognized utterance is a voice command; and a voice command accepting unit configured to accept, when the voice command determination unit determines that the voice command has been uttered, the accepted voice command. The voice command determination unit is configured to, when the recognition result of the accepted utterance indicates that an utterance coincident with a preset voice command at a level equal to or larger than a first threshold has been detected, determine that the recognized utterance is the voice command. The voice command determination unit is configured to, when the recognition result of the accepted utterance indicates that an utterance that is equal to or larger than a second threshold, which indicates a lower degree of coincidence than the first threshold, but less than the first threshold has been detected more than once within a predetermined time period, determine that the recognized utterance is the voice command.

A voice operation method is performed by a voice operation control device, and includes: determining, when an utterance made by a user is recognized and when the recognition result of the accepted utterance indicates that an utterance coincident with a preset voice command at a level equal to or larger than a first threshold has been detected, that the recognized utterance is a voice command, and determining, when the recognition result of the accepted utterance indicates that an utterance that is equal to or larger than a second threshold, which indicates a lower degree of coincidence than the first threshold, but less than the first threshold has been detected more than once within a predetermined time period, that the recognized utterance is the voice command; and accepting, when it is determined that the voice command has been uttered, the accepted voice command.

DETAILED DESCRIPTION

Preferred embodiments of a voice operation control device and a voice operation method according to the present disclosure will be explained with reference to accompanying drawings. Furthermore, the present invention is not limited to the embodiments described below.

First Embodiment

On-Vehicle Recording Device

Figure 1:
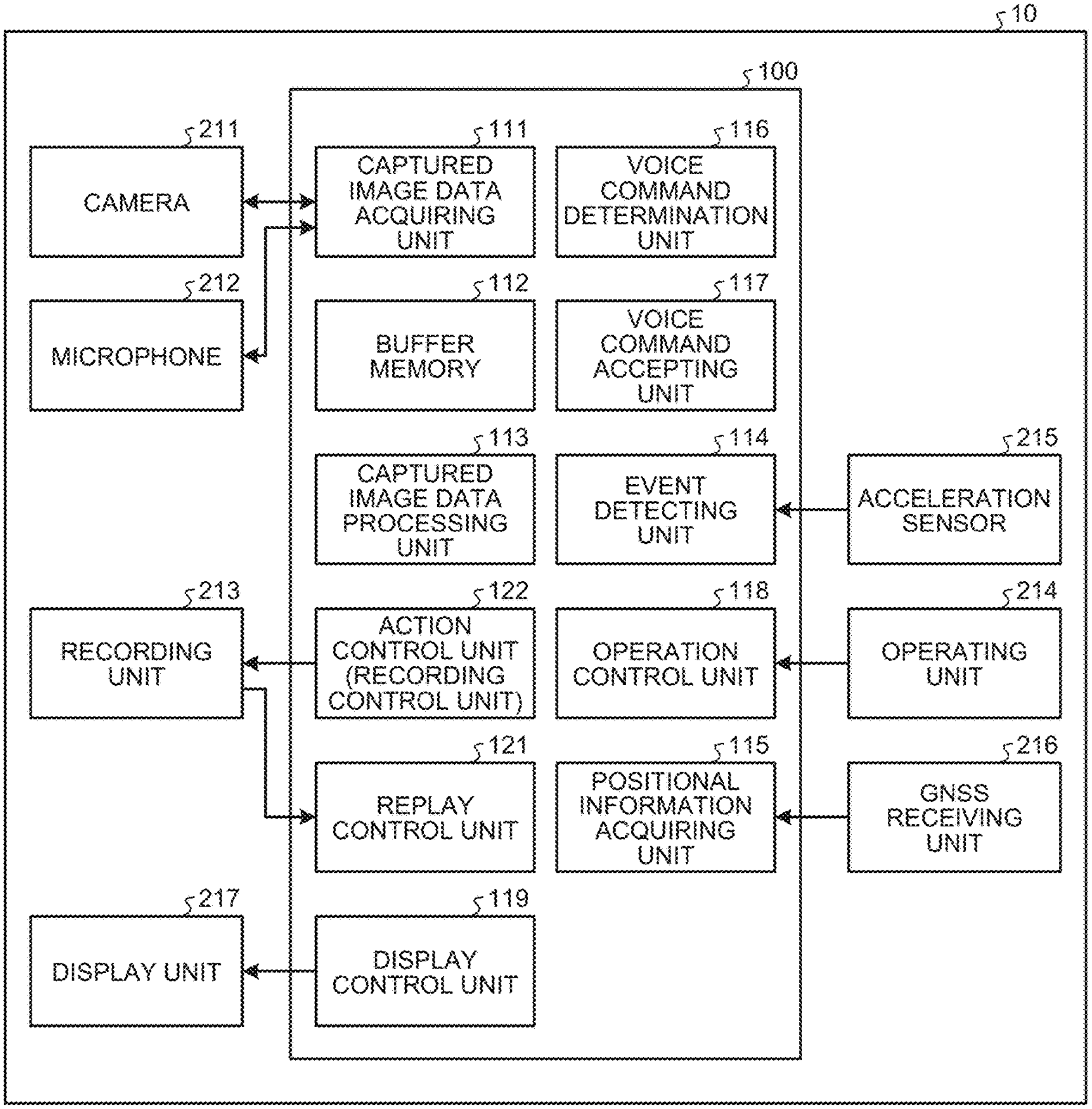
FIG. 1 is a block diagram illustrating a configuration example of an on-vehicle recording device including a control device according to a first embodiment.

FIG. 1 is a block diagram illustrating a configuration example of an on-vehicle recording device (voice operation device) 10 including a voice operation control device 100 (hereinafter, referred to as a "control device") according to a first embodiment. The on-vehicle recording device 10 corresponding to one example of a voice operation device, such as what is called a drive recorder, that records a video image or the like based on an event occurring with respect to a vehicle. Even when a driver is not able to instantly utter an accurate voice command, in the case where, for example, utterances each having a low degree of coincidence have been detected more than once, the on-vehicle recording device 10 determines this state as a voice command and records event data.

The on-vehicle recording device 10 is used in a vehicle. The on-vehicle recording device 10 may be a device that is installed in a vehicle or may be a portable device that is available in the vehicle. Furthermore, the on-vehicle recording device 10 may be implemented by including a function or a configuration of a device that is installed in advance in the vehicle, a navigation device, or the like. The on-vehicle recording device 10 includes a camera 211, a microphone 212, a recording unit 213, an operating unit 214, an acceleration sensor 215, a global navigation satellite system (GNSS) receiving unit 216, a display unit 217, and the control device 100. The on-vehicle recording device 10 may be a device that integrally includes the camera 211 and the microphone 212, or may be a device in which the camera 211 and the microphone 212 are separately constituted.

The camera 211 captures an image of surroundings of the vehicle. The camera 211 may be a group of a plurality of cameras. The camera 211 is arranged at a position at which it is possible to capture an image, for example, in front of the vehicle on the front side of an inside vehicle cabin of a vehicle. In the present embodiment, the camera 211 continuously captures video images while an accessory power supply of the vehicle is ON. The camera 211 outputs captured image data to a captured image data acquiring unit 111 included in the control device 100. The captured image data is a moving image formed of images at, for example, 27.5 frames per second.

The microphone 212 is a microphone that collects voice commands that indicate various kinds of operations performed on the on-vehicle recording device 10. The microphone 212 may be shared with a microphone that inputs voice in addition to the video image received from the camera 211 to the captured image data acquiring unit 111. For example, the microphone 212 is able to receive an operation of storing the captured image data as event data in the recording unit 213. The microphone 212 outputs the collected voice data to a voice command determination unit 116 that is included in the control device 100.

The recording unit 213 is used to temporarily store data for the on-vehicle recording device 10. The recording unit 213 is, for example, a semiconductor memory device, such as a random access memory (RAM) or a flash memory, or a recording medium, such as a memory card. The recording unit 213 may also be an external recording unit that is wirelessly connected via a communication device (not illustrated). The recording unit 213 records loop recording video image data or event data on the basis of a control signal that has been output from a recording control unit 122 that is included in the control device 100.

The operating unit 214 is able to receive various kinds of operation performed on the on-vehicle recording device 10. The operating unit 214 is, for example, a touch panel that is arranged in an overlapping manner on a display screen of the display unit 217. For example, the operating unit 214 is able to receive an operation of manually storing the captured image data as event data in the recording unit 213. For example, the operating unit 214 is able to receive an operation of replaying the loop recording video image data or the event data that is recorded in the recording unit 213. For example, the operating unit 214 is able to receive an operation of deleting the event data that is recorded in the recording unit 213. For example, the operating unit 214 is able to receive an operation of completion of loop recording. The operating unit 214 outputs operation information to an operation control unit 118 included in the control device 100.

The acceleration sensor 215 is a sensor that detects acceleration that occurs in the vehicle. The acceleration sensor 215 outputs a detection result to an event detecting unit 114 included in the control device 100. The acceleration sensor 215 is, for example, a sensor that detects acceleration in 3-axis directions. The 3-axis directions are a front-back direction, a left-right direction, and a vertical direction of the vehicle.

The GNSS receiving unit 216 is constituted by a GNSS receiver that receives a GNSS signal from a GNSS satellite, or the like. The GNSS receiving unit 216 outputs the received positional information signal to a positional information acquiring unit 115 included in the control device 100.

The display unit 217 is, as one example, a display device that is unique to the on-vehicle recording device 10, a display device that is shared with another system including a navigation system, or the like. The display unit 217 may be integrated with the camera 211. The display unit 217 is a display including, for example, a liquid crystal display, an organic electro-luminescence (EL) display, or the like. In the present embodiment, the display unit 217 is arranged on a dashboard, an instrument panel, a center console, or the like in front of a driver of the vehicle. The display unit 217 displays a video image on the basis of a video image signal that is output from a display control unit 119 included in the control device 100. The display unit 217 displays a video image that is being captured by the camera 211 or a video image that has been recorded in the recording unit 213.

Voice Operation Control Device

The control device 100 controls each of the units included in the on-vehicle recording device 10. The control device 100 is an arithmetic processing device (control device) constituted by, for example, a central processing unit (CPU), a micro processing unit (MPU), and the like, and includes a storage device, such as a random access memory (RAM) or a read only memory (ROM). The control device 100 loads a stored program onto a memory and executes a command included in the program. The control device 100 includes an internal memory, such as the above described RAM, and the internal memory is used to temporarily store data of the control device 100. The control device 100 includes, as components of a functional block or the like that is implemented by execution of the program, the captured image data acquiring unit 111, a buffer memory 112, a captured image data processing unit 113, the event detecting unit 114, the positional information acquiring unit 115, the voice command determination unit 116, a voice command accepting unit 117, the operation control unit 118, the display control unit 119, a replay control unit 121, and an action control unit (recording control unit) 122.

The captured image data acquiring unit 111 acquires captured image data of surroundings captured by the camera 211 that captures an image of the surroundings of the vehicle. The captured image data acquiring unit 111 outputs the acquired captured image data to the buffer memory 112.

The buffer memory 112 is an internal memory, such as a RAM, that is included in the control device 100, and is a memory that temporarily stores therein the captured image data, while updating the captured image data, that has an amount corresponding to a certain period of time and that has been acquired by the captured image data acquiring unit 111.

The captured image data processing unit 113 converts the captured image data that is temporarily stored in the buffer memory 112 into an arbitrary file format, such as, for example, the MP4 format, that is encoded by, for example, an arbitrary method, such as H.264 or Moving Picture Experts Group-4 (MPEG-4). The captured image data processing unit 113 generates captured image data as a file with an amount corresponding to a certain period of time from the captured image data that is temporarily stored in the buffer memory 112. As a specific example, the captured image data processing unit 113 generates, as a file, captured image data of 60 seconds in the order of recording, from the captured image data temporarily stored in the buffer memory 112. The captured image data processing unit 113 outputs the generated captured image data to the action control unit (recording control unit) 122. Furthermore, the captured image data processing unit 113 decodes an image of the generated captured image data via the replay control unit 121, and then outputs the captured image data to the display control unit 119. The time period of the captured image data generated as a file is assumed as 60 seconds as one example, but the example is not limited to this. The captured image data mentioned here may be data that includes voice in addition to the video image captured by the camera 211.

The event detecting unit 114 detects an event on the basis of acceleration that is applied to the vehicle. More specifically, the event detecting unit 114 detects an event on the basis of a detection result obtained by the acceleration sensor 215. The event detecting unit 114 detects occurrence of an event in the case where acceleration information that has been acquired from the acceleration sensor 215 by the event detecting unit 114 is equal to or larger than a threshold.

The positional information acquiring unit 115 acquires positional information that indicates a current position of the vehicle. The positional information acquiring unit 115 calculates the positional information on the current position of the vehicle on the basis of the GNSS signal received by the GNSS receiving unit 216 by using a well-known method. The positional information acquiring unit 115 outputs the calculated positional information to the recording control unit 122.

The voice command determination unit 116 recognizes an utterance made by a user, and determines whether or not the recognized utterance is a voice command. The voice command determination unit 116 analyzes the voice that has been input from the microphone 212, and recognizes the content of the utterance included in the voice. The voice command determination unit 116 recognizes the content of the utterance by performing, for each phoneme of word, acoustic model analysis on the voice that has been input from the microphone 212 and comparing with a phonemic model or a language model. The voice command determination unit 116 recognizes a voice command issued to the on-vehicle recording device 10. When the voice command determination unit 116 recognizes the voice command, such as a voice command for instructing to make an event recording, issued to the on-vehicle recording device 10, the voice command determination unit 116 outputs the recognized result to the voice command accepting unit 117.

In the present embodiment, the voice command determination unit 116 determines whether or not the recognized utterance is the voice command for performing a recording of the captured image data. In the present embodiment, the voice command determination unit 116 determines whether or not the recognized utterance is the voice command for performing an event recording of the captured image data.

In the present embodiment, in the case where the recognition result of the accepted utterance indicates that an utterance coincident with a preset voice command at a level equal to or larger than a first threshold has been detected, the voice command determination unit 116 determines that the recognized utterance is the voice command.

The voice command is constituted by, for example, four, five, or more syllables to prevent malfunction. For example, as for a voice command for performing an event recording, "ro-ku-ga-ka-i-shi" (in Japanese, which means "start recording") formed of six syllables or the like is set. In the case where the recognition rate of the voice command is equal to or larger than the first threshold, the voice command determination unit 116 determines that the recognized utterance is the voice command. In the case where the recognition rate of the voice command is less than the first threshold, the voice command determination unit 116 does not determine that the recognized utterance is the voice command. For example, it is assumed that the first threshold is set to 70%. In the case where the recognition rate of the voice command is equal to or larger than, for example, 70%, the voice command determination unit 116 determines that the recognized utterance is the voice command. In the case where the recognition rate of the voice command is less than, for example, 70%, the voice command determination unit 116 does not determine that the recognized utterance is the voice command. The recognition rate of the voice command indicates here is a match rate of the recognized voice with respect to a voice command that is set in advance (hereinafter, referred to as "a preset voice command"). The match rate of the recognized voice mentioned here is a matched syllable rate with respect to the syllables that forms the preset voice command, a degree of coincidence of an original meaning model with respect to all of the preset voice commands, or the like.

A case in which the preset voice command is "ro-ku-ga-ka-i-shi" (in Japanese) will be described. In the case where the voice recognition rate of the recognized utterance with respect to "ro-ku-ga-ka-i-shi" (in Japanese) is equal to or larger than, for example, 70%, the voice command determination unit 116 determines that a voice of "ro-ku-ga-ka-i-shi" (in Japanese) is input and receives a voice operation based on the voice command.

The voice command stored in a drive recorder needs to be redundant in order to prevent malfunction and is also less frequently used, so that it is difficult for a user to memorize and instantly utter with accuracy. In contrast, there may be a case in which urgency and promptness are required for a voice command stored in the drive recorder that is used to record an event, such as an accident. Accordingly, the voice command determination unit 116 has the following function.

In the case where the recognition result of the accepted utterance indicates that an utterance that is equal to or larger than a second threshold, which indicates a lower degree of coincidence than the first threshold, but less than the first threshold has been detected more than once within a predetermined time period T1, the voice command determination unit 116 determines that the recognized utterance is a voice command.

The predetermined time period T1 is, for example, 5 seconds.

For example, the second threshold is set to 50%. In the case where the recognition rate of the recognized voice with respect to the voice command is, for example, equal to or larger than 50% but less than 70% and the voice with a recognition rate that is equal to or larger than 50% but less than 70% has been detected more than once within the predetermined time period T1, the voice command determination unit 116 determines that the recognized utterance is the voice command, that is, determines that the voice command has been uttered. In the case where the recognition rate of the recognized voice with respect to the voice command is less than, for example, 50%, or in the case where the voice with the recognition rate equal to or larger than 50% but less than 70% is not detected more than once within the predetermined time period T1, the voice command determination unit 116 does not determine that the recognized voice is the voice command, that is, determines that the recognized voice is not the voice command.

A case in which the preset voice command is "ro-ku-ga-ka-i-shi" (in Japanese) will be described. In the case where, for example, the voice recognition rate of the recognized voice with respect to "ro-ku-ga-ka-i-shi" (in Japanese) is equal to or larger than 50% but less than 70% and the voice with the voice recognition rate equal to or larger than 50% but less than 70% has been detected more than once within the predetermined time period T1, the voice command determination unit 116 determines that a voice of "ro-ku-ga-ka-i-shi" (in Japanese) has been input. For example, in the case where a voice of "ro-ku-ga" (in Japanese, which means "record") has been uttered twice within the predetermined time period T1, the voice command determination unit 116 determines that the voice of "ro-ku-ga-ka-i-shi" (in Japanese) has been input. For example, in the case where the voice of "ka-i-shi" (in Japanese, which means "start") and the voice of "ro-ku-ga" (in Japanese) have been uttered within the predetermined time period T1, the voice command determination unit 116 determines that the voice of "ro-ku-ga-ka-i-shi" (in Japanese) has been input. For example, in the case where the voice recognition rate of "ro-ku-ga-ka-i-shi" (in Japanese) is less than 50% or the voice with the voice recognition rate that is equal to or larger than 50% but less than 70% is not detected more than once within the predetermined time period T1, the voice command determination unit 116 does not determine that the voice of "ro-ku-ga-ka-i-shi" (in Japanese) has not been input. For example, in the case where the voice of "ro-ku-ga" (in Japanese) has been uttered once within the predetermined time period T1, the voice command determination unit 116 does not determine that the voice of "ro-ku-ga-ka-i-shi" (in Japanese) has been input. For example, in the case where the voice of "sa-tsu-e-i" (in Japanese, which means "capture an image") has been uttered twice within the predetermined time period T1, the voice command determination unit 116 does not determine that the voice of "ro-ku-ga-ka-i-shi" has been input.

In the case where the voice command determination unit 116 determines that the voice command has been uttered, the voice command accepting unit 117 accepts the accepted voice command. The voice command accepting unit 117 accepts, on the basis of the recognition result obtained by the voice command determination unit 116 with respect to the voice that has been input from the microphone 212, the voice that has been input from the microphone 212 as the voice command for instructing to perform various operations. For example, the voice command accepting unit 117 accepts a voice command for instructing to perform a replay operation or a voice command for instructing to perform an operation of deleting the captured image data and outputs a control signal. For example, the voice command accepting unit 117 accepts a voice command for instructing to complete the loop recording, and then outputs a control signal. The voice command accepting unit 117 accepts a voice command for instructing to perform an event recording, and then outputs a control signal. For example, the voice command accepting unit 117 accepts a voice command of "ro-ku-ga-ka-i-shi" as the voice command for instructing to perform the event recording, and then outputs the control signal.

In the case where the voice command accepting unit 117 acquires recognition of an utterance from the voice command determination unit 116 indicating an instruction to perform an event recording, the voice command accepting unit 117 outputs a control signal to instruct to perform the event recording to the recording control unit 122. In the case where the voice command accepting unit 117 acquires recognition of an utterance from the voice command determination unit 116 indicating an instruction to perform a replay operation, the voice command accepting unit 117 outputs a control signal to instruct to perform the replay operation to the replay control unit 121.

The operation control unit 118 acquires operation information on various operations accepted by the operating unit 214. More specifically, the operation control unit 118 accepts an operation performed on a physical interface, such as a touch panel. For example, the operation control unit 118 acquires replay operation information indicating a replay operation or deletion operation information indicating an operation of deleting captured image data, and outputs a control signal. For example, the operation control unit 118 acquires completion operation information indicating an operation of completing a loop recording, and outputs a control signal.

The display control unit 119 controls display of the captured image data on the display unit 217. The display control unit 119 outputs a video image signal for causing the captured image data to be output to the display unit 217. More specifically, the display control unit 119 outputs the video image that is being captured by the camera 211, or outputs a video image signal that is displayed by replay of loop recording video image data that is recorded in the recording unit 213 or replay of the event data.

The replay control unit 121 controls replay of the loop recording video image data or the event data recorded in the recording unit 213 on the basis of the control signal of the replay operation output from the operation control unit 118. The replay control unit 121 includes a decoder (not illustrated), and replays various kinds of data by decoding the supplied compressed data.

The action control unit 122 performs an action based on the voice command that has been accepted by the voice command accepting unit 117. In the present embodiment, as one example of the action control unit 122, the recording control unit 122 will be described. The recording control unit 122 performs control of causing the recording unit 213 to record the captured image data that is generated as a file by the captured image data processing unit 113. During a time period in which a loop recording process is being performed, such as when an accessory power supply of the vehicle is ON, the recording control unit 122 records the captured image data that is generated as a file by the captured image data processing unit 113 in the recording unit 213 as rewritable captured image data. More specifically, the recording control unit 122 continuously records the captured image data generated by the captured image data processing unit 113 in the recording unit 213 during the time period in which the loop recording process is being performed, and when the capacity of the recording unit 213 becomes full, the recording unit 213 records new captured image data by overwriting the oldest captured image data.

In the case where an event has been detected by the event detecting unit 114, the recording control unit 122 stores the captured image data corresponding to the detection of the event. The captured image data corresponding to the detection of the event is captured image data of a predetermined time period among pieces of captured image data that are generated by the captured image data processing unit 113. The recording control unit 122 stores the captured image data corresponding to the detection of the event in the recording unit 213 as event data for which overwrite is prohibited.

Figure 2:
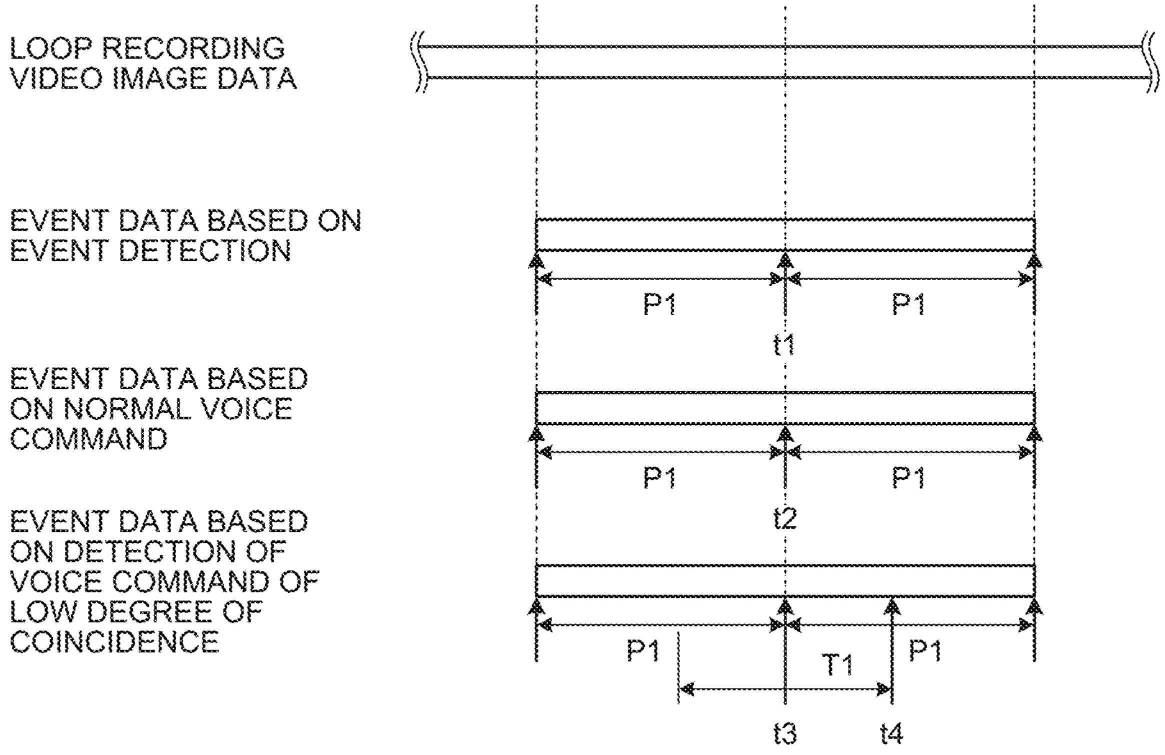
FIG. 2 is a diagram illustrating one example of a recording time period of event data.

In the case where an event has been detected by the event detecting unit 114, the recording control unit 122 stores, as the event data, the captured image data of a predetermined time period before and after the event detection time point regarded as the starting point. FIG. 2 is a diagram illustrating one example of a recording time period of the event data. As illustrated in FIG. 2, the event detecting unit 114 stores, as the event data, the captured image data obtained in a time period from a time point retroactive to a time period P1 from a time point t1 at which the event is detected to a time point after elapse of the time period P1 since the time point t1. In the case where an event has been detected by the event detecting unit 114, the recording control unit 122 copies the captured image data of a predetermined time period before and after the time point t1 at which the event is detected, such as, for example, 10 seconds, from the buffer memory 112 and stores the copied captured image data as the event data.

The predetermined time period before and after mentioned above is, for example, 10 seconds obtained by adding the time period P1 (for example, 5 seconds) before a certain time point to the time period P1 (for example, 5 seconds) after the certain time point. The time period before the certain time point and the time period after another certain time period may be used.

In the present embodiment, the recording control unit 122 stores the captured image data acquired by the captured image data acquiring unit 111 on the basis of the voice command that has been accepted by the voice command accepting unit 117.

In the present embodiment, in the case where the voice command determination unit 116 detects a voice command by detecting an utterance coincident with the preset voice command at a level equal to or larger than the first threshold, the recording control unit 122 stores, as the event data, the captured image data of a predetermined time period before and after the time point of detection of the voice command regarded as the starting point. As illustrated in FIG. 2, the recording control unit 122 stores, as the event data, the captured image data obtained in a time period from a time point retroactive to the time period P1 from a time point t2 at which a voice command is accepted to a time point after elapse of the time period P1 since the time point t2 at which the voice command is accepted. For example, the recording control unit 122 stores, as the event data, the captured image data obtained in a time period of 10 seconds before and after the time point at which the voice command is accepted.

In the case where the voice command determination unit 116 has detected a voice command by detecting an utterance with a recognition rate equal to or larger than the second threshold but less than the first threshold with respect to the preset voice command more than once within the predetermined time period T1, the recording control unit 122 stores, as the event data, the captured image data obtained in a predetermined time period before and after a time point t3 at which a first utterance is detected among the utterances that are detected more than once (hereinafter, referred to as an “utterance detection time point”), regarding the time point t3 as the starting point. In the present embodiment, the recording control unit 122 stores, as the event data, the captured image data obtained in a predetermined time period before and after the first utterance detection time point regarding as the starting point. As illustrated in FIG. 2, in the case where an utterance equal to or larger than the second threshold but less than the first threshold is detected more than once within the predetermined time period T1, such as the utterance detection time points t3 and t4, the recording control unit 122 stores, as the event data, the captured image data obtained in a time period starting from a time point retroactive to the time period P1 from the first utterance detection time point t3 to a time point after elapse of the time period P1 since the first utterance detection time point t3. For example, the recording control unit 122 stores, as the event data, the captured image data obtained in a time period of 10 seconds before and after the utterance detection time point t3.

When an instant reaction is needed, such as when a driver desires to urgently perform an event recording, there is a high possibility that the driver is unable to accurately utter the voice command. In such a case, an accurate voice command is not uttered, but a voice command at a low recognition rate is often uttered more than once. Accordingly, in the case where the voice command at the low recognition rate is accepted more than once within the predetermined time period T1, the recording control unit 122 stores the event data based on the initial utterance detection time point as the starting point. As a result of this, the event data obtained in an appropriate time period is stored even if an accurate voice command is not uttered.

Information Processing Performed in Voice Operation Control Device

Figure 3:
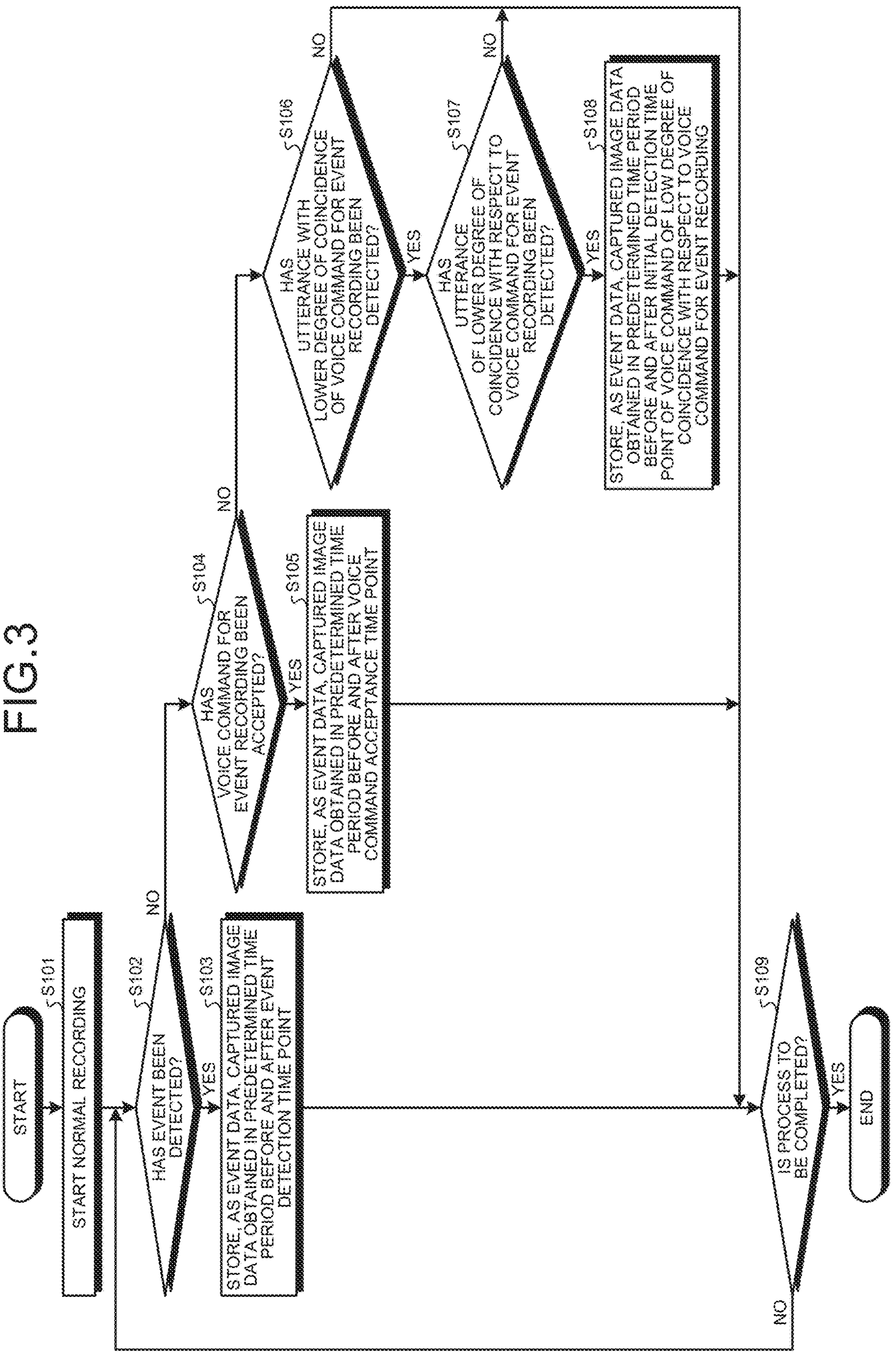
FIG. 3 is a flowchart illustrating one example of the flow of a process performed in the control device according to the first embodiment.

In the following, the flow of the process performed in the control device 100 will be described with reference to FIG. 3. The process indicated by the flowchart illustrated in FIG. 3 is started as a result of the on-vehicle recording device 10 being activated. While the on-vehicle recording device 10 is being activated, in the control device 100, acceleration at a threshold of set acceleration is detected by the acceleration sensor 215. The control device 100 causes the event detecting unit 114 to start event detection on the basis of the detected acceleration. A description of the event detection obtained by the acceleration will be omitted here. Furthermore, while the on-vehicle recording device 10 is being activated, in the control device 100, a recognition process for the voice that has been input from the microphone 212 is performed.

As processing begins, the control device 100 starts a loop recording that is a normal recording (Step S101). More specifically, the recording control unit 122 starts to perform the loop recording for recording the file generated by the captured image data processing unit 113 into the recording unit 213 such that the file can be overwritten to the recording unit 213. The loop recording performed by the recording control unit 122 and the event detection performed by the event detecting unit 114 and the voice command accepting unit 117 are continued until the process is ended. The control device 100 proceeds to Step S102.

The control device 100 determines whether or not an event has been detected on the basis of the detection result obtained by the event detecting unit 114 (Step S102). If the acceleration detected by the event detecting unit 114 is equal to or larger than the threshold, the control device 100 determines that the event has been detected (Yes at Step S102), and proceeds to Step S103. If the control device 100 determines that the acceleration detected by the event detecting unit 114 is not equal to or larger than the threshold, the control device 100 determines that the event is not detected (No at Step S102), and proceeds to Step S104.

If the control device 100 determines that the event has been detected (Yes at Step S102), the control device 100 causes the recording control unit 122 to store, as the event data, the captured image data obtained in a predetermined time period before and after the event detection time point (Step S103). More specifically, the control device 100 causes the recording control unit 122 to store, as the event data, the captured image data in a time period between the time point retroactive to the time period P1 from the event detection time point and the time point after the time period P1 since the event detection time point such that overwriting in the recording unit 213 is prohibited. The control device 100 proceeds to Step S109.

If the control device 100 determines that the event has not been detected (No at Step S102), the control device 100 determines whether or not the voice command for instructing to perform the event recording has been accepted (Step S104). More specifically, in the case where the recognition result of the accepted utterance indicates that the utterance coincident with the preset voice command at a level equal to or larger than the first threshold has been detected by the voice command determination unit 116, the control device 100 determines that the voice command for instructing to perform the event recording has been accepted. In the case where the control device 100 determines that the voice command for instructing to perform the event recording has been accepted by the voice command determination unit 116 (Yes at Step S104), the control device 100 proceeds to Step S105. Alternatively, in the case where the control device 100 does not determine that the voice command for instructing to perform the event recording has been accepted by the voice command determination unit 116 (No at Step S104), the control device 100 proceeds to Step S109.

In the case where the control device 100 determines that the voice command for instructing to perform the event recording has been accepted by the voice command determination unit 116 (Yes at Step S104), the control device 100 causes the recording control unit 122 to store the captured image data obtained in a predetermined time period before and after the voice command acceptance time point as the event data (Step S105). More specifically, The control device 100 causes the recording control unit 122 to store, as the event data, the captured image data captured in a time period between the time point retroactive to the time period P1 from the voice command acceptance time point and the time point after the time period P1 since the voice command acceptance time point such that overwriting in the recording unit 213 is prohibited. The control device 100 proceeds to Step S109.

In the case where the control device 100 does not determine that the voice command for instructing to perform the event recording has been accepted (No at Step S104), the control device 100 determines whether or not an utterance of a low degree of coincidence with respect to the voice command for instructing to perform the event recording has been detected (Step S106). More specifically, in the case where the recognition result of the accepted utterance indicates that the utterance equal to or larger than the second threshold but less than the first threshold has been detected by the voice command determination unit 116, the control device 100 determines that the utterance of a low degree of coincidence with respect to the voice command for instructing to perform the event recording has been detected. In the case where the control device 100 determines that the utterance of a low degree of coincidence with respect to the voice command for instructing to perform the event recording has been detected (Yes at Step S106), the control device 100 proceeds to Step S107. In the case where the control device 100 does not determine that the utterance of a low degree of coincidence with respect to the voice command for instructing to perform the event recording has been detected (No at Step S106), the control device 100 proceeds to Step S109.

In the case where the control device 100 determines that the utterance of a low degree of coincidence with respect to the voice command for instructing to perform the event recording has been detected (Yes at Step S106), the control device 100 determines whether or not the utterance of a low degree of coincidence with respect to the voice command for instructing to perform the event recording has been detected within the predetermined time period T1 (Step S107). In the case where the utterance of a low degree of coincidence has been detected more than once within the predetermined time period T1 by the voice command determination unit 116 (Yes at Step S107), the control device 100 proceeds to Step S108. In the case where the utterance of a low degree of coincidence has not been detected more than once within the predetermined time period T1 by the voice command determination unit 116 (No at Step S107), the control device 100 proceeds to Step S109.

In the case where the utterance of a low degree of coincidence has not been detected more than once within the predetermined time period T1 (No at Step S107), the control device 100 causes the recording control unit 122 to store, as the event data, the captured image data obtained in a predetermined time period before and after an initial detection time point of a voice command that is a low degree of coincidence with respect to the voice command for instructing to perform the event recording (Step S108). More specifically, the control device 100 causes the recording control unit 122 to store, as the event data, the captured image data obtained in a time period between the time point retroactive to the time period P1 from the initial utterance detection time point to the time point after the time period P1 since the initial utterance detection time point such that overwriting in the recording unit 213 is prohibited. The control device 100 proceeds to Step S109.

The control device 100 determines whether or not the process is to be completed (Step S109). For example, the control device 100 determines that the process is to be completed when a power source or a driving source of the vehicle is turned off or when an operation is performed on the operating unit 214. In the case where the control device 100 determines that the process is to be completed (Yes at Step S109), the control device 100 completes the process. In the case where the control device 100 does not determine that the process is to be completed (No at Step S109), the control device 100 performs the process at Step S102 again.

Effects

As described above, according to the present embodiment, in the case where it is indicated that the utterance of a low degree of coincidence with respect to the preset voice command has been detected more than once within the predetermined time period, it is possible to determine that the recognized utterance is the voice command. According to the present embodiment, in the case where the utterance of a low degree of coincidence is performed more than once due to inability to instantly recall the voice command, it is possible to determine this state as a voice command.

According to the present embodiment, in the case where it is indicated that the utterance of a low degree of coincidence with respect to the voice command for instructing to record the captured image data has been detected more than once within the predetermined time period, it is possible to determine that the recognized utterance is the voice command. According to the present embodiment, in the case where the utterance of a low degree of coincidence more than once due to inability to instantly recall the voice command when the user desired to record the captured image data, it is possible for the user to perform a recording of the captured image data.

According to the present embodiment, in the case where the utterance of a low degree of coincidence with respect to the voice command for instructing to perform the event recording has been detected more than once within the predetermined time period, it is possible to determine that the recognized utterance is the voice command. According to the present embodiment, in the case where the utterance of a low degree of coincidence more than once due to inability to instantly recall the voice command when an event has occurred, it is possible to perform a recording of the captured image data as the event data.

According to the present embodiment, it is possible to appropriately to determine, on the basis of the utterance of a low degree of coincidence, the voice command that is stored in the drive recorder, that needs to be redundant, that is less frequently used, that is hard for a user to memorize and instantly utter with accuracy. According to the present embodiment, urgency and promptness are sometimes required to record the captured image data, and it is possible to record the captured image data in an appropriate time period without a delay from the timing for the recording.

Second Embodiment

Figure 4:
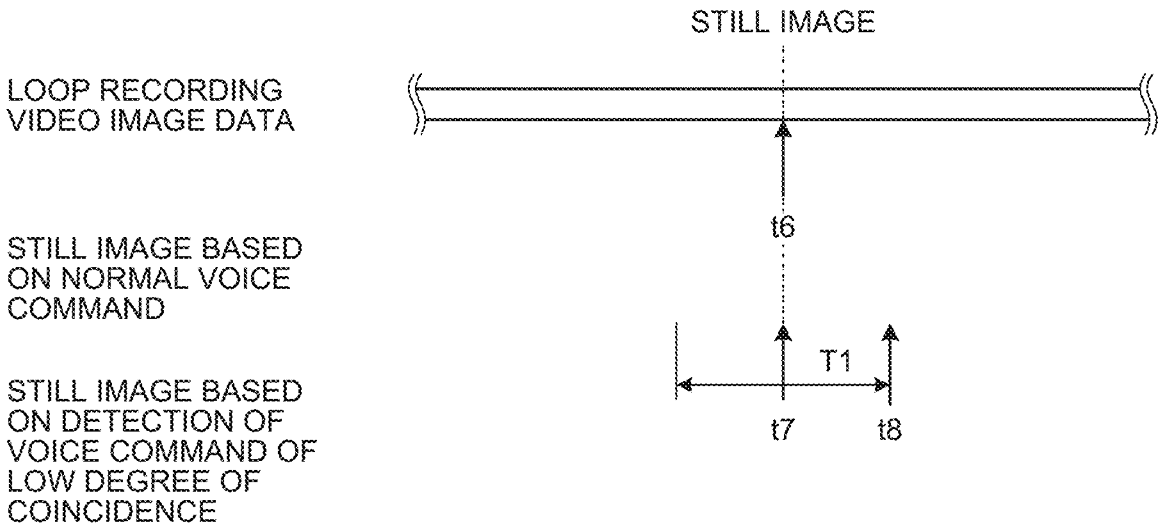
FIG. 4 is a diagram illustrating one example of a time point at which a still image is recorded.
Figure 5:
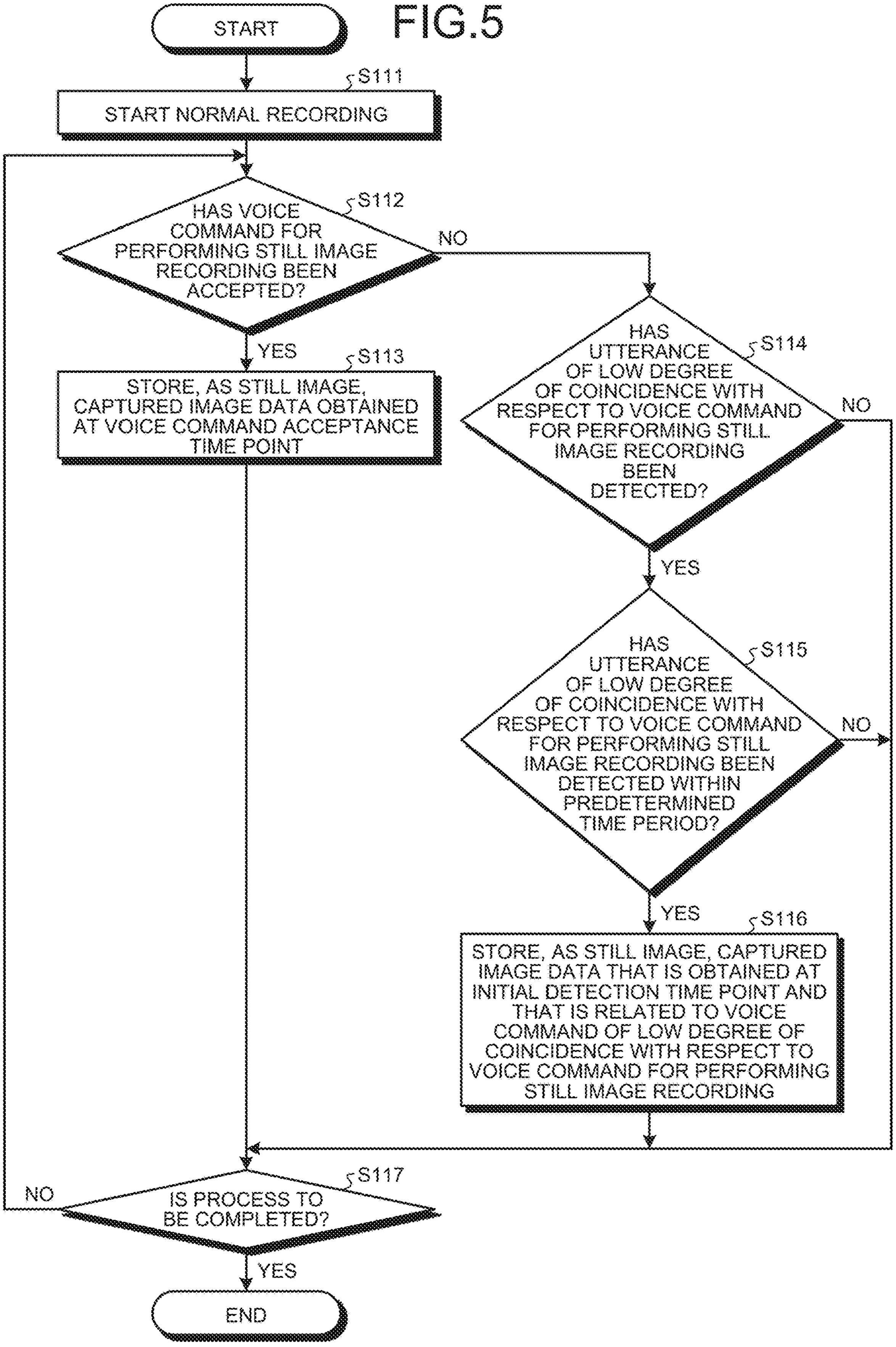
FIG. 5 is a flowchart illustrating one example of the flow of a process performed in a control device according to a second embodiment.

The on-vehicle recording device 10 according to the present embodiment will be described with reference to FIG. 4 and FIG. 5. FIG. 4 is a diagram illustrating one example of a recording time point of a still image. FIG. 5 is a flowchart illustrating one example of the flow of a process performed in a control device according to a second embodiment. The basic configuration of the on-vehicle recording device 10 is the same as that of the on-vehicle recording device 10 according to the first embodiment. In a description below, components having the same function as those of the on-vehicle recording device 10 are assigned the same or the corresponding reference numerals and descriptions thereof in detail will be omitted. In the present embodiment, the processes performed in the operating unit 214, the voice command determination unit 116, the voice command accepting unit 117, the operation control unit 118, and the recording control unit 122 are different from the processes described above in the first embodiment.

The operating unit 214 is able to accept an operation of performing a still image recording.

The voice command determination unit 116 determines whether or not the recognized utterance is the voice command for performing a recording of the still image of the captured image data. In the case where the voice command determination unit 116 recognizes the voice command for instructing to perform the still image recording, the voice command determination unit 116 outputs the recognized result to the voice command accepting unit 117.

The voice command accepting unit 117 accepts the voice command for instructing to perform the still image recording. For example, the voice command accepting unit 117 accepts the voice command of "sha-shi-n-sa-tsu-e-i" (in Japanese, which means "take a picture") as the voice command for instructing to perform the still image recording, and outputs a control signal. In the case where the voice command accepting unit 117 acquires information indicating that the utterance of an instruction to perform the still image recording from the voice command determination unit 116, the voice command accepting unit 117 outputs the control signal for instructing to perform the still image recording to the recording control unit 122.

The operation control unit 118 acquires the operation information that indicates the still image recording, and outputs the control signal.

In the case where the voice command determination unit 116 has detected the voice command by detecting an utterance coincident with the preset voice command indicating the still image recording at a level equal to or larger than the first threshold, the recording control unit 122 stores the still image obtained at the voice command acceptance time point. In the case where the voice command accepting unit 117 accepts the voice command for instructing to perform the still image recording, the recording control unit 122 stores the still image obtained at the voice command acceptance time point. As illustrated in FIG. 4, for example, the recording control unit 122 stores the still image obtained at a voice command acceptance time point t6.

In the case where the utterance that is equal to or larger than the second threshold but less than the first threshold has been detected by the voice command determination unit 116 more than once within the predetermined time period T1, the recording control unit 122 determines that the voice command has been detected, and stores the still image obtained at an initial utterance detection time point t7. As illustrated in FIG. 4, in the case where the utterance that is equal to or larger than the second threshold but less than the first threshold has been detected at the time point t7 and a time point t8 within the predetermined time period T1, the recording control unit 122 stores the still image obtained at the initial utterance detection time point t7. In the case where the preset voice command is, for example, "sha-shi-n-sa-tsu-e-i" (in Japanese) and in the case where an utterance of, for example, "sha-shi-n" (in Japanese, which means "a picture"), "sa-tsu-e-i-su-ru" (in Japanese, which means "photograph"), or the like has been detected more than once in the predetermined time period T1 as an utterance with the voice recognition rate that is equal to or larger than the second threshold but less than the first threshold, the recording control unit 122 determines that the voice command has been detected.

In the following, the flow of the process performed in the control device 100 will be described with reference to FIG. 5. The processes at Step S111 and Step S117 illustrated in FIG. 5 are the same processes at Step S101 and Step S109 indicated in the flowchart illustrated in FIG. 3.

The control device 100 determines whether or not the voice command for instructing to perform the still image recording has been accepted (Step S112). More specifically, in the case where the recognition result of the accepted utterance indicates that the utterance coincident with the preset voice command at a level equal to or larger than the first threshold has been detected by the voice command determination unit 116, the control device 100 determines that the voice command for instructing to perform the still image recording has been accepted. In the case where the control device 100 determines that the voice command for instructing to perform the still image recording has been accepted by the voice command determination unit 116 (Yes at Step S112), the control device 100 proceeds to Step S113. Alternatively, in the case where the control device 100 does not determine that the voice command for instructing to perform the still image recording has been accepted by the voice command determination unit 116 (No at Step S112), the control device 100 proceeds to Step S114.

In the case where the control device 100 determines that the voice command for instructing to perform the still image recording has been accepted (Yes at Step S112), the control device 100 causes the recording control unit 122 to store the captured image data obtained at the voice command acceptance time point as the still image (Step S113). The control device 100 proceeds to Step S117.

In the case where the control device 100 does not determine that the voice command for instructing to perform the still image recording has been accepted (No at Step S112), the control device 100 determines whether or not the utterance of a low degree of coincidence with respect to the voice command for instructing to perform the still image recording has been detected (Step S114). More specifically, in the case where the recognition result of the accepted utterance indicates that the utterance equal to or larger than the second threshold but less than the first threshold has been detected by the voice command determination unit 116, the control device 100 determines that the utterance of a low degree of coincidence with respect to the voice command for instructing to perform the still image recording has been detected. In the case where the control device 100 determines that the utterance of a low degree of coincidence with respect to the voice command for instructing to perform the still image recording has been detected (Yes at Step S114), the control device 100 proceeds to Step S115. In the case where the control device 100 does not determine that the utterance of a low degree of coincidence with respect to the voice command for instructing to perform the still image recording has been detected (No at Step S114), the control device 100 proceeds to Step S117.

In the case where the control device 100 determines that the utterance of a low degree of coincidence with respect to the voice command for instructing to perform the still image recording has been detected (Yes at Step S114), the control device 100 determines whether or not the utterance of a low degree of coincidence with respect to the voice command for instructing to perform the still image recording has been detected within the predetermined time period T1 (Step S115). In the case where the utterance of a low degree of coincidence has been detected more than once within the predetermined time period T1 by the voice command determination unit 116 (Yes at Step S115), the control device 100 proceeds to Step S116. In the case where the utterance of a low degree of coincidence has not been detected more than once within the predetermined time period T1 by the voice command determination unit 116 (No at Step S115), the control device 100 proceeds to Step S117.

In the case where the utterance of a low degree of coincidence has been detected more than once within the predetermined time period T1 (Yes at Step S115), the control device 100 causes the recording control unit 122 to store, as the still image, the captured image data that is obtained at the initial detection time point and that is related to the voice command of a low degree of coincidence with respect to the voice command for instructing to perform the still image recording (Step S116). The control device 100 proceeds to Step S117.

As described above, according to the present embodiment, in the case where it is indicated that the utterance of a low degree of coincidence with respect to the voice command for instructing to perform the still image recording has been detected more than once within the predetermined time period, it is determined that the recognized utterance is the voice command, so that it is possible to record the still image obtained at an appropriate timing.

Third Embodiment

Video Image Recording Device

Figure 6:
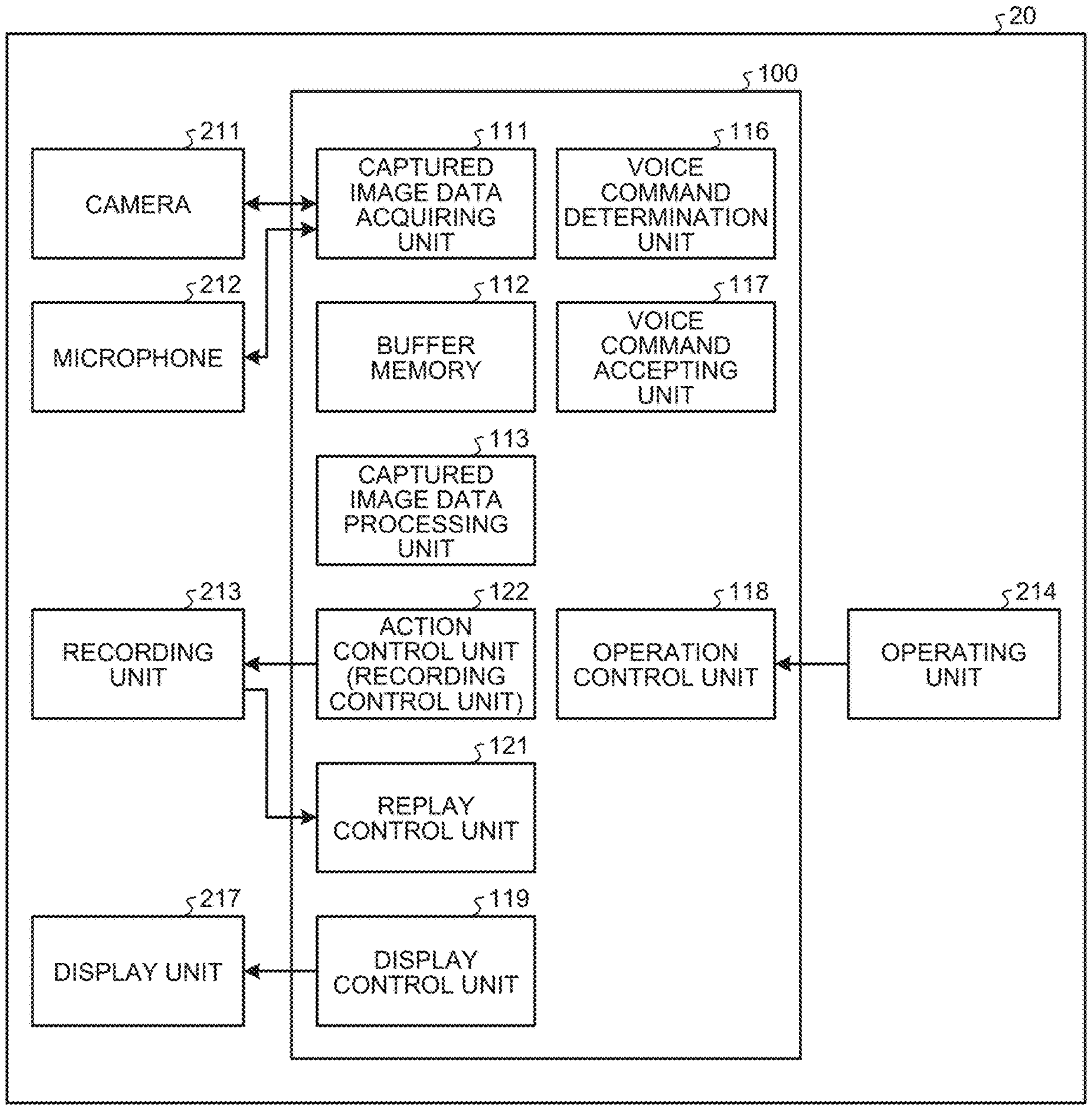
FIG. 6 is a block diagram illustrating a configuration example of a video image recording device including a control device according to a third embodiment.
Figure 7:
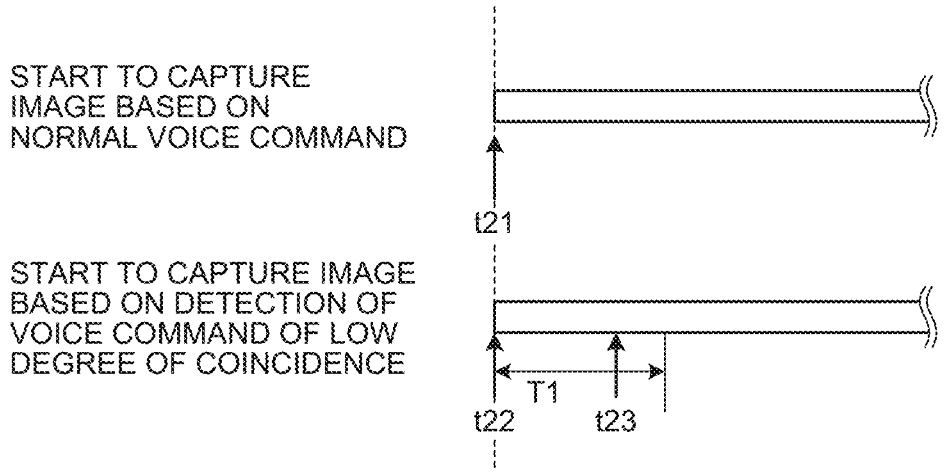
FIG. 7 is a diagram illustrating one example of a time point at which capturing of a video image is started.
Figure 8:
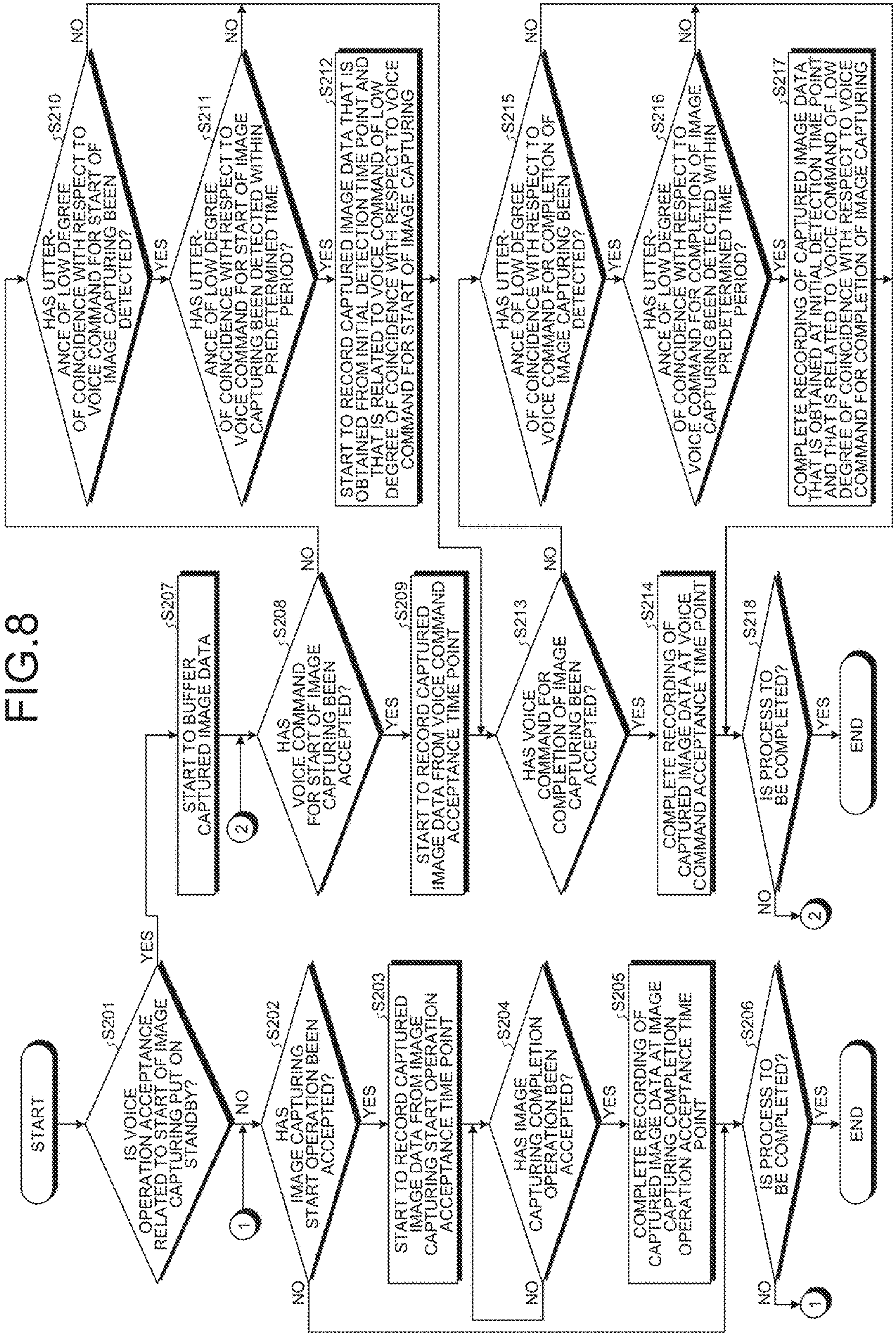
FIG. 8 is a flowchart illustrating one example of the flow of a process performed in the control device according to the third embodiment.

A video image recording device (voice operation device) 20 that includes the voice operation control device (hereinafter, referred to as the "control device") 100 according to the present embodiment will be described with reference to FIG. 6 to FIG. 8. FIG. 6 is a block diagram illustrating a configuration example of the video image recording device 20 that includes the control device 100 according to a third embodiment. FIG. 7 is a diagram illustrating one example of an image capturing start time point of the video image. FIG. 8 is a flowchart illustrating one example of the flow of a process performed in the control device 100 according to the third embodiment. The video image recording device 20 that is one example of the voice operation device is a device, such as a smartphone or a video camera, that records a video image or a voice. The video camera includes what is called an action camera. Even when, for example, a voice command is not able to be uttered or a voice command is not able to be appropriately recognized, in the case where an utterance of a low degree of coincidence has been detected more than once, the video image recording device 20 determines that the utterance is a voice command and starts to capture an image, in other words, starts to record the captured video image or the voice. Components having the same configuration as those of the on-vehicle recording device 10 are assigned the same or the corresponding reference numerals and descriptions thereof in detail will be omitted.

As illustrated in FIG. 6, the video image recording device 20 includes the camera 211, the microphone 212, the recording unit 213, the operating unit 214, the display unit 217, and the control device 100.

The camera 211 captures a video image. In the present embodiment, the camera 211 captures the video image by an image capturing image capturing instruction obtained from a voice command.

The microphone 212 is a microphone that collects voice commands that indicates various operations performed on the video image recording device 20. For example, the microphone 212 is able to accept an image capturing instruction that has been given by a voice command.

The operating unit 214 is able to accept various operations performed on the video image recording device 20. For example, the operating unit 214 is able to accept an instruction indicating whether or not a voice operation is to be accepted. If an instruction to accept the voice operation has been accepted, an acceptance of the voice operation is put on standby by the voice command determination unit 116 that will be described later.

The display unit 217 is arranged at a position viewable by the user.

Voice Operation Control Device

The control device 100 includes, as components, such as functional blocks, that are implemented by executing programs, the captured image data acquiring unit 111, the buffer memory 112, the captured image data processing unit 113, the voice command determination unit 116, the voice command accepting unit 117, the operation control unit 118, the display control unit 119, a replay control unit 121, and the action control unit (recording control unit) 122.

The captured image data acquiring unit 111 acquires the captured image data that has been captured by the camera 211. The captured image data acquiring unit 111 outputs the acquired captured image data to the captured image data processing unit 113 or the buffer memory 112.

The buffer memory 112 starts to buffer the captured image data obtained by the captured image data acquiring unit 111 in a certain time period as a result of an image capturing instruction output by a voice command being able to be accepted.

The captured image data processing unit 113 generates the captured image data obtained in a certain time period as a file from the captured image data that has been acquired by the captured image data acquiring unit 111 or the captured image data that is temporarily stored by the buffer memory 112. As a specific example, regarding the captured image data that has been acquired by the captured image data acquiring unit 111 or the captured image data that is temporarily stored by the buffer memory 112, the captured image data processing unit 113 generates the captured image data of 60 seconds in the order of recording as a file. The captured image data processing unit 113 outputs the generated captured image data to the action control unit (recording control unit) 122. Furthermore, the captured image data processing unit 113 decodes an image of the generated captured image data via the replay control unit 121, and then outputs the captured image data to the display control unit 119.

In the case where the voice command determination unit 116 recognizes a voice command, such as a voice command for instructing to start to perform the image capturing with respect to the video image recording device 20 or a voice command for instructing to complete the image capturing, the voice command determination unit 116 outputs the recognized result to the voice command accepting unit 117.

In the present embodiment, the voice command determination unit 116 determines whether or not the recognized utterance is the voice command for performing a start process of image capturing or the voice command for performing a completion process of the image capturing.

Similarly to the first embodiment, the voice command for performing a start process of image capturing is also constituted by, for example, four, five, or more syllables to prevent malfunction. For example, as for the voice command for performing a start process of image capturing, "ro-ku-ga-ka-i-shi" (in Japanese) formed of six syllables or the like is set.

The voice command stored in the video image recording device 20 needs to be redundant in order to prevent malfunction and is assumed to be less likely to give an accurate utterance, depending on its usage form. In contrast, an instruction to start to perform the image capturing is usually given at a timing at which image capturing is desired to be started, so that, when an instruction to start to perform the image capturing is accepted, the image capturing needs to be promptly started. Accordingly, the voice command determination unit 116 includes the following function.

The voice command accepting unit 117 accepts a voice command for instructing to start to perform the image capturing and a voice command for instructing to complete the image capturing, and outputs a control signal. For example, the voice command accepting unit 117 accepts a voice command of "ro-ku-ga-ka-i-shi" (in Japanese) as the voice command for instructing to start to perform the image capturing, and outputs a control signal. The voice command accepting unit 117 acquires, from the voice command determination unit 116, information indicating that an utterance of an instruction to start to perform the image capturing has been recognized, the voice command accepting unit 117 outputs a control signal for instructing to start to perform the image capturing to the recording control unit 122. For example, the voice command accepting unit 117 accepts a voice command of "ro-ku-ga-shu-u-ryo-u" (in Japanese, which means "finish recording") as a voice command for instructing to complete the image capturing, and then outputs a control signal. In the case where the voice command accepting unit 117 has acquired, from the voice command determination unit 116, information indicating that an utterance of an instruction to complete the image capturing has been recognized, the voice command accepting unit 117 outputs a control signal for instructing to complete the image capturing to the recording control unit 122.

The operation control unit 118 acquires operation information that indicates an operation indicating whether or not a voice operation with respect to the operating unit 214 is to be accepted, and then outputs a control signal.

The action control unit 122 performs an action based on the voice command that has been accepted by the voice command accepting unit 117. In the present embodiment, as one example of the action control unit 122, the recording control unit 122 will be described. The recording control unit 122 performs control of causing the captured image data generated as a file by the captured image data processing unit 113 to be recorded in the recording unit 213. The recording control unit 122 records, in the recording unit 213 included in the video image recording device 20, the captured image data generated as a file by the captured image data processing unit 113 in a time period between a time point at which an image capturing start operation is performed and a time point at which an image capturing completion operation is performed.

In the present embodiment, in the case where the voice command determination unit 116 has detected a voice command by detecting an utterance coincident with the preset voice command at a level equal to or larger than the first threshold has been detected, the recording control unit 122 starts a recording of the captured image data after the time point at which the voice command is detected. As illustrated in FIG. 7, the recording control unit 122 starts a recording of the captured image data starting from a voice command acceptance time point t21.

In the case where the voice command determination unit 116 has detected a voice command by detecting an utterance with a recognition rate equal to or larger than the second threshold but less than the first threshold with respect to the preset voice command more than once within the predetermined time period T1, the recording control unit 122 stores, as the event data, the captured image data obtained in a predetermined time period before and after an initial utterance detection time point among the utterances that are detected more than once. As illustrated in FIG. 7, in the case where an utterance equal to or larger than the second threshold but less than the first threshold is detected more than once within the predetermined time period T1, as indicated by utterance detection time points t22 and t23, the voice command determination unit 116 starts a recording of the captured image data from the initial utterance detection time point t22.

Information Processing Performed in Voice Operation Control Device

In the following, the flow of the process performed in the control device 100 will be described with reference to FIG. 8. The processes indicated in the flowchart illustrated in FIG. 8 are started as a result of the video image recording device 20 being activated. While the video image recording device 20 is being activated, in the control device 100, a recognition process is performed on the voice that has been input from the microphone 212.

As processing begins, the control device 100 determines whether or not a voice operation acceptance related to a start of image capturing is put on standby (Step S201). More specifically, the operation control unit 118 determines whether or not operation information on an operation indicating whether or not a voice operation is to be accepted has been acquired. In the case where the operation indicating whether or not a voice operation is to be accepted has been acquired, the operation control unit 118 determines that the voice operation acceptance related to a start of image capturing is put on standby. In the case where the control device 100 determines that the voice operation acceptance related to a start of image capturing is put on standby (Yes at Step S201), the control device 100 proceeds to Step S207. The processes at Step S207 to Step S218 are the processes performed based on a voice command. In the case where the control device 100 does not determine that the voice operation acceptance related to a start of image capturing is put on standby (No at Step S201), the control device 100 proceeds to Step S202. The processes at Step S202 to Step S206 are performed based on the various operations performed with respect to the operating unit 214.

In the case where does not determine that the voice operation acceptance related to a start of image capturing is put on standby (No at Step S201), the control device 100 determines whether or not the image capturing start operation has been accepted (Step S202). More specifically, the operation control unit 118 determines whether or not the operation information that indicates the image capturing start operation has been acquired from the operating unit 214. In the case where the operation information that indicates the image capturing start operation has been acquired, the operation control unit 118 determines that the image capturing start operation has been accepted. In the case where the control device 100 determines that the image capturing start operation has been accepted (Yes at Step S202), the control device 100 proceeds to Step S203. In the case where the control device 100 does not determine that the image capturing start operation has been accepted (No at Step S202), the control device 100 proceeds to Step S206.

In the case where the control device 100 determines that the image capturing start operation has been accepted (Yes at Step S202), the control device 100 causes the recording control unit 122 to start a recording of the captured image data from an image capturing start operation acceptance time point (Step S203). The control device 100 proceeds to Step S204.

The control device 100 determines whether or not an image capturing completion operation has been accepted (Step S204). More specifically, the operation control unit 118 determines whether or not the operation information that indicates the image capturing completion operation has been acquired from the operating unit 214. In the case where the operation information that indicates the image capturing completion operation has been acquired, the operation control unit 118 determines that the image capturing completion operation has been accepted. In the case where the control device 100 determines that the image capturing completion operation has been accepted (Yes at Step S204), the control device 100 proceeds to Step S205. In the case where the control device 100 does not determine that the image capturing completion operation has been accepted (No at Step S204), the control device 100 performs the process at Step S204 again.

In the case where the control device 100 determines that the image capturing completion operation has been accepted (Yes at Step S204), the control device 100 causes the recording control unit 122 to complete the recording process of the captured image data at the image capturing completion operation acceptance time point (Step S205). The control device 100 proceeds to Step S206.

The control device 100 determines whether or not the process is to be completed (Step S206). For example, the control device 100 determines that the process is to be completed when a power source or a driving source of the video image recording device 20 is turned off or when an operation is performed on the operating unit 214. In the case where the control device 100 determines that the process is to be completed (Yes at Step S206), the control device 100 ends the process. In the case where the control device 100 does not determine that the process is to be completed (No at Step S206), the control device 100 performs the process at Step S202 again.

In the case where the control device 100 determines that the voice operation acceptance related to a start of image capturing is put on standby (Yes at Step S201), the control device 100 starts to buffer the captured image data (Step S207). More specifically, the recording control unit 122 causes the buffer memory 112 to start to buffer the captured image data obtained in a certain time period acquired by the captured image data acquiring unit 111. The control device 100 proceeds to Step S208.

The control device 100 determines whether or not a voice command for instructing to start to perform image capturing has been accepted (Step S208). More specifically, in the case where the recognition result of the accepted utterance indicates that the utterance coincident with the preset voice command at a level equal to or larger than the first threshold has been detected by the voice command determination unit 116, the control device 100 determines that the voice command for instructing to start to perform image capturing. In the case where the control device 100 determines that a voice command for instructing to start to perform image capturing has been accepted by the voice command determination unit 116 (Yes at Step S208), the control device 100 proceeds to Step S209. Alternatively, in the case where the control device 100 does not determine that a voice command for instructing to start to perform image capturing has been accepted by the voice command determination unit 116 (No at Step S208), the control device 100 proceeds to Step S210.

In the case where the control device 100 determines by the voice command determination unit 116 that a voice command for instructing to start to perform image capturing has been accepted (Yes at Step S208), the control device 100 causes the recording control unit 122 to start a recording of the captured image data from the voice command acceptance time point (Step S209). More specifically, the control device 100 gives the recording control unit 122 permission to overwrite the captured image data captured from the voice command acceptance time point in the recording unit 213 and causes the recording control unit 122 to store the captured image data. The control device 100 proceeds to Step S210.

In the case where the control device 100 does not determine that a voice command for instructing to start to perform image capturing has been accepted by the voice command determination unit 116 (No at Step S208), the control device 100 determines whether or not an utterance of a low degree of coincidence with respect to the voice command for instructing to start to perform the image capturing has been detected (Step S210). More specifically, in the case where the recognition result of the accepted utterance indicates that the utterance equal to or larger than the second threshold but less than the first threshold has been detected by the voice command determination unit 116, the control device 100 determines that the utterance of a low degree of coincidence with respect to the voice command for instructing to start to perform the image capturing has been detected. In the case where the control device 100 determines that the utterance of a low degree of coincidence with respect to the voice command for instructing to start to perform the image capturing has been detected (Yes at Step S210), the control device 100 proceeds to Step S211. In the case where the control device 100 does not determine that the utterance of a low degree of coincidence with respect to the voice command for instructing to start to perform image capturing has been detected (No at Step S210), the control device 100 proceeds to Step S213.

In the case where the control device 100 determines that the utterance of a low degree of coincidence with respect to the voice command for instructing to start to perform the image capturing has been detected (Yes at Step S210), the control device 100 determines whether or not an utterance of a low degree of coincidence with respect to the voice command for instructing to start to perform the image capturing has been detected within the predetermined time period T1 (Step S211). In the case where an utterance of a low degree of coincidence with respect to the voice command for instructing to start to perform the image capturing has been detected within the predetermined time period T1 by the voice command determination unit 116 (Yes at Step S211), the control device 100 proceeds to Step S212. In the case where an utterance of a low degree of coincidence with respect to the voice command for instructing to start to perform the image capturing has not been detected within the predetermined time period T1 by the voice command determination unit 116 (No at Step S211), the control device 100 proceeds to Step S213.

In the case where an utterance of a low degree of coincidence with respect to the voice command for instructing to start to perform the image capturing has not been detected within the predetermined time period T1 (Yes at Step S211), the control device 100 causes the recording control unit 122 to start to record the captured image data that is obtained from the initial detection time point and that is related to the voice command of a low degree of coincidence with respect to the voice command for instructing to start to perform the image capturing (Step S212). More specifically, the control device 100 gives the recording control unit 122 permission to overwrite the captured image data from the initial utterance detection time point in the recording unit 213 and causes the recording control unit 122 to store the captured image data. The control device 100 proceeds to Step S213.

The control device 100 determines whether or not a voice command for instructing to complete the image capturing has been accepted (Step S213). More specifically, in the case where the recognition result of the accepted utterance indicates that the utterance coincident with the preset voice command at a level equal to or larger than the first threshold has been detected by the voice command determination unit 116, the control device 100 determines that the voice command for instructing to complete image capturing has been accepted. In the case where the control device 100 determines that the voice command for instructing to complete the image capturing has been accepted by the voice command determination unit 116 (Yes at Step S213), the control device 100 proceeds to Step S214. Alternatively, in the case where the control device 100 does not determine that the voice command for instructing to complete the image capturing has been accepted by the voice command determination unit 116 (No at Step S213), the control device 100 proceeds to Step S215.

In the case where the control device 100 determines that the voice command for instructing to complete the image capturing has been accepted (Yes at Step S213), the control device 100 causes the recording control unit 122 to complete the recording process of captured image data at the voice command acceptance time point (Step S214). The control device 100 proceeds to Step S218.

In the case where the control device 100 does not determine that the voice command for instructing to complete the image capturing has been accepted (No at Step S213), the control device 100 determines whether or not the utterance of a low degree of coincidence with respect to the voice command for instructing to complete the image capturing has been detected (Step S215). More specifically, in the case where the recognition result of the accepted utterance indicates that the utterance equal to or larger than the second threshold but less than the first threshold has been detected by the voice command determination unit 116, the control device 100 determines that the utterance of a low degree of coincidence with respect to the voice command for instructing to complete the image capturing has been detected. In the case where the control device 100 determines that the utterance of a low degree of coincidence with the voice command for instructing to complete the image capturing has been detected (Yes at Step S215), the control device 100 proceeds to Step S216. In the case where the control device 100 does not determine that the utterance of a low degree of coincidence with respect to the voice command for instructing to complete the image capturing has been detected (No at Step S215), the control device 100 proceeds to Step S218.

In the case where the control device 100 determines that the utterance of a low degree of coincidence with respect to the voice command for instructing to complete the image capturing has been detected (Yes at Step S215), the control device 100 determines whether or not an utterance of a low degree of coincidence with respect to the voice command for instructing to complete the image capturing has been detected within the predetermined time period T1 (Step S216). In the case where an utterance of a low degree of coincidence with respect to the voice command for instructing to complete the image capturing has been detected within the predetermined time period T1 by the voice command determination unit 116 (Yes at Step S216), the control device 100 proceeds to Step S217. In the case where an utterance of a low degree of coincidence with respect to the voice command for instructing to complete the image capturing has not been detected within the predetermined time period T1 by the voice command determination unit 116 (No at Step S216), the control device 100 proceeds to Step S218.

In the case where an utterance of a low degree of coincidence with respect to the voice command for instructing to complete the image capturing has been detected within the predetermined time period T1 (Yes at Step S216), the control device 100 completes the recording process of captured image data that is obtained at the initial detection time point by the recording control unit 122 and that is related to the voice command of a low degree of coincidence with respect to the voice command for instructing to complete the image capturing (Step S217). More specifically, the control device 100 causes the recording control unit 122 to store the captured image data up to the initial utterance detection time point in the recording unit 213. The control device 100 proceeds to Step S218.

The control device 100 determines whether or not the process is to be completed (Step S218). For example, the control device 100 determines that the process is to be completed when a power source or a driving source of the vehicle is turned off or when an operation is performed on the operating unit 214. In the case where it is determined that the process is to be completed (Yes at Step S218), the control device 100 completes the process. In the case where it is not determined that the process is to be completed (No at Step S218), the control device 100 performs the process at Step S208 again.

Effects

As described above, according to the present embodiment, even in the case where the user is not able to accurately utter the voice command or in the case where the user has accurately utter words, it is possible to record a video image or a still image at an appropriate timing in the case where it is not possible to accurately the voice command.

The on-vehicle recording device 10 according to the present disclosure may also be implemented with various kinds of embodiments other than the embodiments described above. In the above described embodiment, a case has been described as an example by using the on-vehicle recording device 10 that included the voice operation control device 100; however, the technology described in the present disclosure may also be applicable to devices other than the on-vehicle recording device 10. For example, the technology described in the present disclosure may also be applicable to various devices each of which controls a device by using a voice command. Therefore, in the above described embodiment, the recording control unit 122 has been described as one example of the action control unit 122, but the action control unit 122 is also applicable to various kinds of control, such as control to record voice, in addition to record control of a video image.

In the above described embodiment, a case has been described without including a concept of a duration of an utterance corresponding to a detection object as an utterance detection time point, but, in the utterance detection time point t3 or the utterance detection time point t7, there is a duration during which an utterance of, for example, "ro-ku-ga" (in Japanese) or the like is made between a start time point and a completion time point. Therefore, in the utterance detection time point t3 or the utterance detection time point t7, the start time point, the completion time point, or the like of such an utterance may be set, and an arbitrary setting is possible for the time period between the start time point and the completion time point of the utterance.

Each of the components included in the on-vehicle recording device 10 illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

The configuration of the on-vehicle recording device 10 is implemented as, for example, software, by programs, or the like loaded in a memory. In the embodiments described above, the description has been given as the functional blocks that are implemented in cooperation with these pieces of hardware or software. In other words, the functional blocks can be implemented in various forms by using only hardware, using only software, or using a combination of hardware and software.

According to the present disclosure, an advantage is provided in that it is possible to appropriately perform a recording of a video image or a still image on the basis of a voice command.

The voice operation control device and the voice operation method according to the present disclosure is able to be used for, for example, a drive recorder.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A voice operation control device comprising:

a processor for executing computer executable instructions stored on a memory, the processor configured to:

recognize an utterance made by a user and determine whether the recognized utterance is a voice command; and the voice command has been uttered, the accepted voice command;

acquire captured image data captured by a camera that captures a video image;

perform an action based on the voice command accepted;

when the recognition result of the accepted utterance indicates that an utterance coincident with a preset voice command at a level equal to or larger than a first threshold has been detected, determine that the recognized utterance is the voice command;

when the recognition result of the accepted utterance indicates that an utterance that is equal to or larger than a second threshold, which indicates a lower degree of coincidence than the first threshold, but less than the first threshold has been detected more than once within a predetermined time period, determine that the recognized utterance is the voice command;

store, based on the voice command accepted, the captured image data acquired;

determine whether the recognized utterance is the voice command for performing event recording of the captured image data;

store as event data, when detecting the voice command by detecting the utterance coincident with the preset voice command at the level equal to or larger than the first threshold, the captured image data obtained in the predetermined time period before and after a time point at which the voice command is detected; and store as event data, when detecting the voice command by detecting the utterance equal to or larger than the second threshold but less than the first threshold more than once within the predetermined time period, the captured image data obtained in the predetermined time period based on the time point at which an initial utterance is detected among the utterances that are detected more than once.

2. A voice operation control device comprising:

a processor for executing computer executable instructions stored on a memory, the processor configured to:

recognize an utterance made by a user and determine whether the recognized utterance is a voice command;

accept, when the voice command has been uttered, the accepted voice command;

acquire captured image data captured by a camera that captures a video image;

perform an action based on the voice command accepted;

when the recognition result of the accepted utterance indicates that an utterance coincident with a preset voice command at a level equal to or larger than a first threshold has been detected, determine that the recognized utterance is the voice command;

when the recognition result of the accepted utterance indicates that an utterance that is equal to or larger than a second threshold, which indicates a lower degree of coincidence than the first threshold, but less than the first threshold has been detected more than once within a predetermined time period, determine that the recognized utterance is the voice command;

store, based on the voice command accepted, the captured image data acquired;

determine whether the recognized utterance is the voice command for recording a still image of the captured image data;

store, when detecting the voice command by detecting the utterance coincident with the preset voice command at the level equal to or larger than the first threshold, the still image at the time point at which the voice command is detected; and the voice command by detecting the utterance equal to or larger than the second threshold but less than the first threshold more than once within the predetermined time period, the still image obtained at the time point at which an initial utterance is detected among the utterances that are detected more than once.

3. A voice operation control device comprising:

a processor for executing computer executable instructions stored on a memory, the processor configured to:

recognize an utterance made by a user and determine whether the recognized utterance is a voice command;

accept, when the voice command has been uttered, the accepted voice command;

acquire captured image data captured by a camera that captures a video image;

perform an action based on the voice command accepted;

when the recognition result of the accepted utterance indicates that an utterance coincident with a preset voice command at a level equal to or larger than a first threshold has been detected, determine that the recognized utterance is the voice command;

when the recognition result of the accepted utterance indicates that an utterance that is equal to or larger than a second threshold, which indicates a lower degree of coincidence than the first threshold, but less than the first threshold has been detected more than once within a predetermined time period, determine that the recognized utterance is the voice command;

store, based on the voice command accepted, the captured image data acquired;

determine whether the recognized utterance is the voice command for performing a start process of image capturing;

start, when detecting the voice command by detecting the utterance coincident with the preset voice command at the level equal to or larger than the first threshold, to record the captured image data based on the time point at which the voice command is detected; and detecting the voice command by detecting the utterance equal to or larger than the second threshold but less than the first threshold more than once within the predetermined time period, to record the captured image data based on the time point at which an initial utterance is detected among the utterances that are detected more than once.

* * * * *